(12) United States Patent
Blindheim

(10) Patent No.: US 11,529,693 B2
(45) Date of Patent: Dec. 20, 2022

(54) SEGMENTED SAW

(71) Applicant: Blims AS, Trondheim (NO)

(72) Inventor: Jørgen Blindheim, Tronheim (NO)

(73) Assignee: BLIMS AS

( * ) Notice: Subject to any disclaimer, the term of this patent is extended or adjusted under 35 U.S.C. 154(b) by 0 days.

(21) Appl. No.: 17/159,795

(22) Filed: Jan. 27, 2021

(65) Prior Publication Data

US 2021/0291284 A1    Sep. 23, 2021

Related U.S. Application Data

(60) Provisional application No. 62/990,791, filed on Mar. 17, 2020.

(51) Int. Cl.
*B23D 49/10*         (2006.01)
*B23D 61/12*         (2006.01)

(52) U.S. Cl.
CPC ........... *B23D 49/10* (2013.01); *B23D 61/123* (2013.01)

(58) Field of Classification Search
CPC .... B23D 49/10; B23D 61/123; Y10T 83/9326
See application file for complete search history.

(56) References Cited

U.S. PATENT DOCUMENTS

| | | | |
|---|---|---|---|
| 201,444 A * | 3/1878 | Lougheed | B23D 61/123 83/661 |
| 311,975 A * | 2/1885 | Wallace | B05B 11/00444 222/189.09 |
| 837,439 A | 12/1906 | Wallace | |
| 853,282 A * | 5/1907 | Wallace | B23D 61/123 83/838 |
| 1,274,255 A | 7/1918 | Freas | |
| 1,718,746 A * | 6/1929 | Lougheed Overend | B23D 61/123 76/112 |
| 2,931,674 A * | 4/1960 | Davies | B23D 61/121 439/894 |
| 4,043,367 A | 8/1977 | Knuth | |
| 2002/0081165 A1* | 6/2002 | Hecht | B23C 5/08 407/110 |
| 2010/0018065 A1 | 1/2010 | Janssson et al. | |
| 2012/0042765 A1 | 2/2012 | Kazda et al. | |

FOREIGN PATENT DOCUMENTS

DE      202006003049 U1    5/2006
EP           3632602 A1    4/2020

* cited by examiner

*Primary Examiner* — Sean M Michalski
*Assistant Examiner* — Fernando A Ayala
(74) *Attorney, Agent, or Firm* — Barnes & Thornburg LLP; Steven D. Shipe

(57) ABSTRACT

Devices, systems, and methods for a segmented tool include a connection system for selectively connecting segments together for use. The connection system can be collectively formed of complementary portions of the segments which can be interlocked together to block against disconnection.

18 Claims, 9 Drawing Sheets

SEGMENTED SAW

CROSS-REFERENCE

This U.S. Non-Provisional Patent Application claims the benefit of priority of U.S. Provisional Application No. 62/990,791, filed on Mar. 17, 2020, the disclosure of which is incorporated by reference in its entirety, including but without limitation, those portions related to segmented tools, including cutting tools.

FIELD

The present disclosure relates to devices, systems, and methods for segmented tools. More particularly, the present disclosure related to segmenting cutting tools, such as saws, including saw blades, to promote portability. For example, in activities requiring mobility, the length of saw blades can be cumbersome. Although no particular saw blade length may be required, segmenting the blade of a saw into multiple pieces can increase packability. However, selectively joining segmented saw blades for use can be challenging.

SUMMARY

The present application discloses one or more of the features recited in the appended claims and/or the following features which, alone or in any combination, may comprise patentable subject matter.

According to an aspect of the present disclosure, a segmented tool may include a first segment, a second segment for selective connection with the first segment, wherein at least one of the first and second segments includes a working surface, and a connection system. The connection system may include complementary portions of each of the first and second segments for engagement together to selectively connect the first and second segments to define a working length along a longitudinal direction. The complementary portion of one of the first and second segments may include a latch extending for engagement with the other of the first and second segments. The latch may be configured for resilient deflection to selectively interlock with the other of the first and second segments.

In some embodiments, the latch may include an arm extending along the longitudinal direction. The arm may extend undeflected along a working plane oriented with the working surface. The working plane may be oriented orthogonally relative to resilient deflection of the latch for latching.

In some embodiments, the latch may include a latch head connected with the arm and defining an abutment surface for engagement with the other one of the first and second segments to selectively block against disconnection of the first and second segments from each other. The abutment surface may face towards the arm. The abutment surface may be defined for engagement with a key of the other of the other one of the first and second segments. The key may define a complementary abutment surface for engagement with the abutment surface of the latch head.

In some embodiments, the latch may be configured for resilient lateral deflection misaligning the latch head and the key along the longitudinal direction to permit the latch head and key to pass each other along the longitudinal direction. The latch and the key may be aligned along the longitudinal direction without lateral deflection of the latch. In some embodiments, the abutment surface of the latch head may be defined in a recess of the arm.

In some embodiments, at least one of the head and the key may include a ramp angled across the longitudinal direction to encourage lateral deflection of the latch under longitudinal force between the head and the other of the first and second segments for latching. The head may include a ramp angled across the longitudinal direction to encourage lateral deflection of the latch under longitudinal force between the head and the other of the first and second segments for latching. In some embodiments, the latch may be undeflected in an interlocked state between the first and second segments.

In some embodiments, at least one of the first and second segments may include a connection head and the other of the first and second segments may include a receiver configured to receive the connection head. The connection head and the receiver may collectively define a fulcrum connection by engagement therebetween to permit pivoting of the first and second segments relative to each other about the fulcrum connection to pass the latch around a key of the other of the first and second segments.

In some embodiments, one of the connection head and the receiver may define a tongue. The other of the connection head and the receiver may define a groove to form a tongue and groove connection. Each of the tongue and groove may be formed centrally to define the tongue and groove connection symmetrically.

In some embodiments, the connection head may include a number of knuckles. The receiver may include a number of detents. Each detent may be arranged to receive a corresponding one of the knuckles. In some embodiments, a tongue and groove connection may be formed between at least one of the knuckles and at least one of the detents complementary with the at least one knuckle.

In some embodiments, the segmented tool may further include a third segment selectively connectable with the second segment, distal from the first segment. At least one of the first and second segments may include a handle for grasping by a user's hand. The latch may be integrally formed with the one of the first and second segments.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
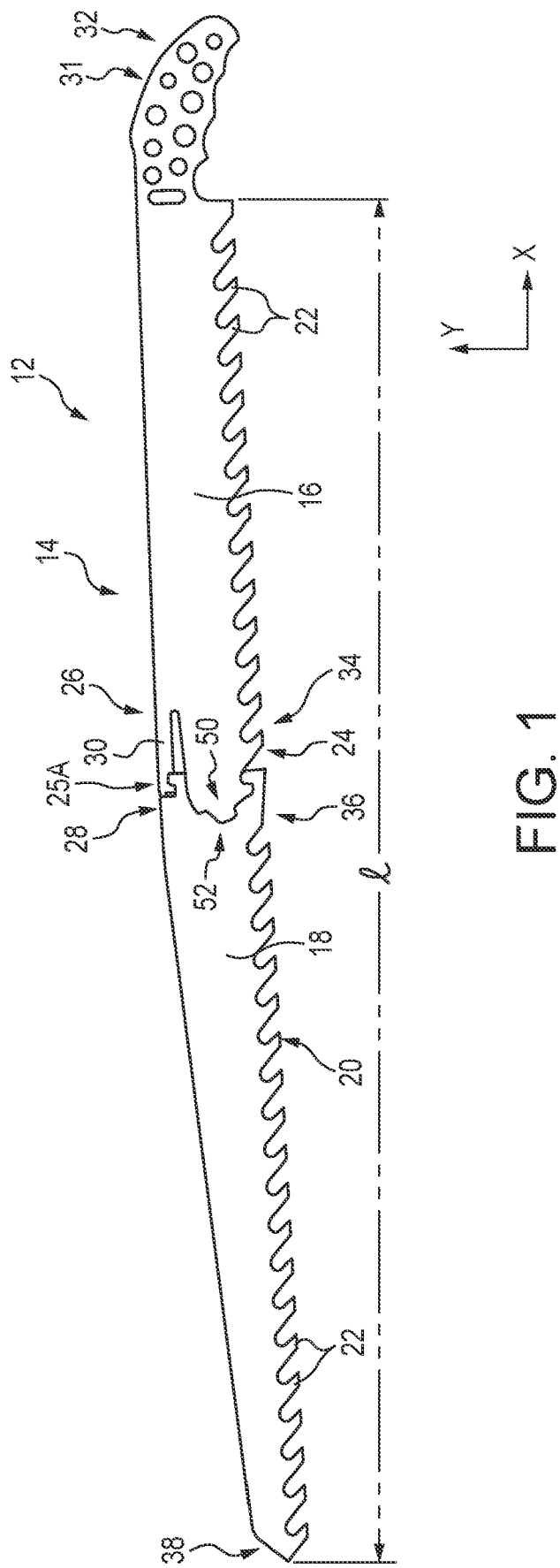
FIG. 1 is a side elevation view of a segmented tool having segments selectively connected together in an interlocked state by a connection system.

For the purposes of promoting an understanding of the principles of the disclosure, reference will now be made to a number of illustrative embodiments illustrated in the drawings and specific language will be used to describe the same.

Portability and/or packability of tools can increase the access of tools to various environments. Whether industrial, urban, rural, and/or natural, tools can often be required to be transported to the location for use, particularly where the subject of their use is immovable or inconvenient to move. Moreover, specialized tools with particular use-specific design can provide advantages to their particular use, and may benefit from enhanced portability features if they are to be transported on-site for use.

For example, cutting tools, such as saws, can benefit from having a length of blade for cutting. Yet, blade length itself can be cumbersome and detract from portability of the tool. Such tool issues can be particularly impactful for tools having specialized uses. For example, as the desire for portability of the tool increases based on use in remote areas, the challenges of blade length can increase. Moreover, specialized uses themselves may include a desire for tool features that increase the challenges of transport. For example, saws for specific use, such as for cutting wood and/or saws for cutting snow and/or ice, may benefit in cutting from a long blade length, while long blade length presents challenges to packing and/or carrying the saw itself. Reducing the transport length of the tool, while maintaining a sufficiently long use length can address such challenges.

Traditional methods of addressing such challenges can include folding tools, which may rigidly lock into an extended position. However, conventional folding tools can experience unintentional disengagement and/or folding, which can be hazardous. Some traditional methods experiencing unintentional disengagement may be impacted by foreign material jamming into or otherwise disrupting locking features. Indeed, for cutting tools, the potential for exposure of the tool to loose material can be enhanced, including loose material from the subject matter to be cut, e.g., wood, snow/ice, etc. Traditional methods may also require external assembly tools to achieve appropriate use form, e.g., locking, and the need for additional tools can be troublesome to overall portability.

In one specialized case, it may be desirable for a snow saw for cutting snow and/or ice to have a long blade. For example, snow saws for conducting stability tests on the snowpack for avalanche risk assessment may benefit from long blade length in use. Yet, it can be desirable to pack such tools in a state having a reduced length to promote portability, such as when carried in a backpack for accessing the desired sampling site.

Referring now to FIG. 1, a segmented tool 12 is shown in a working state for use. The segmented tool 12 is illustratively embodied as a saw, including a working member embodied as a blade 14 comprising various segments 16, 18 selectively connected together in the working state. The blade 14 defines a working surface 20, embodied as a cutting edge defined by teeth 22. The segments 16, 18 are each formed to have a height and length defined in the x-y plane defined as the working plane along which a working force, embodied as a cutting force, can be applied to a subject.

The segmented tool 12 includes a connection system 24 for selectively connecting the segments 16, 18 together for tool use. In the illustrative embodiment, the connection system 24 is defined by complementary portions 26, 28 of each of the segments 16, 18. As discussed in additional detail herein, interlocking between the portions 26, 28 of the segments 16, 18 can define a rigid connection 25A to establish the working blade length l. By releasing interlock between the portions 26, 28 of the segments 16, 18, the rigid connection 25A can be disassembled to disconnect the segments 16, 18 from each other, as suggested in FIG. 2, showing a disassembled state.

The connection system 24 includes a latch 30 extending from the segment 16 for engagement with the other segment 18 to form the connection 25A. As discussed in additional detail herein, the latch 30 is configured for resilient deflection to selectively interlock the portions 26, 28. Selective interlocking between the portions 26, 28 permits selective assembly and disassembly of the portions into the working state and disassembled state, respectively.

Figure 2:
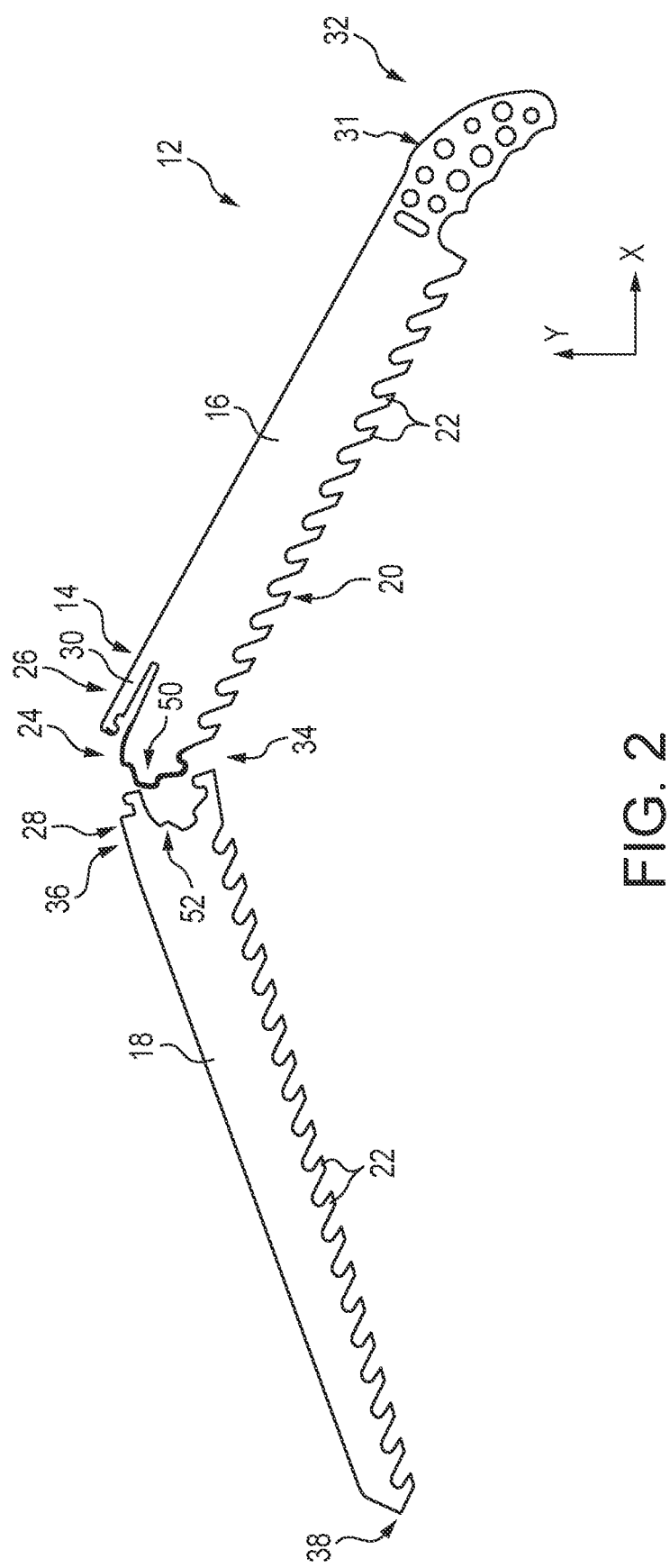
FIG. 2 is a side elevation view of the segmented tool of FIG. 1 showing the segmented tool is in a disconnected state in which the segments are disconnected from each other.

In the illustrative embodiment of FIGS. 1 and 2, the segment 16 includes a handle 31. The handle 31 is illustratively formed on a proximal end 32 of the segment 16 opposite a connection end 34 including the complementary portion 26. The handle 31 is ergonomically shaped for a user's hand to grasp. The segment 18 illustratively includes a connection end 36 including the complementary portion 28, and a distal end 38 opposite the connection end 36.

Figure 3:
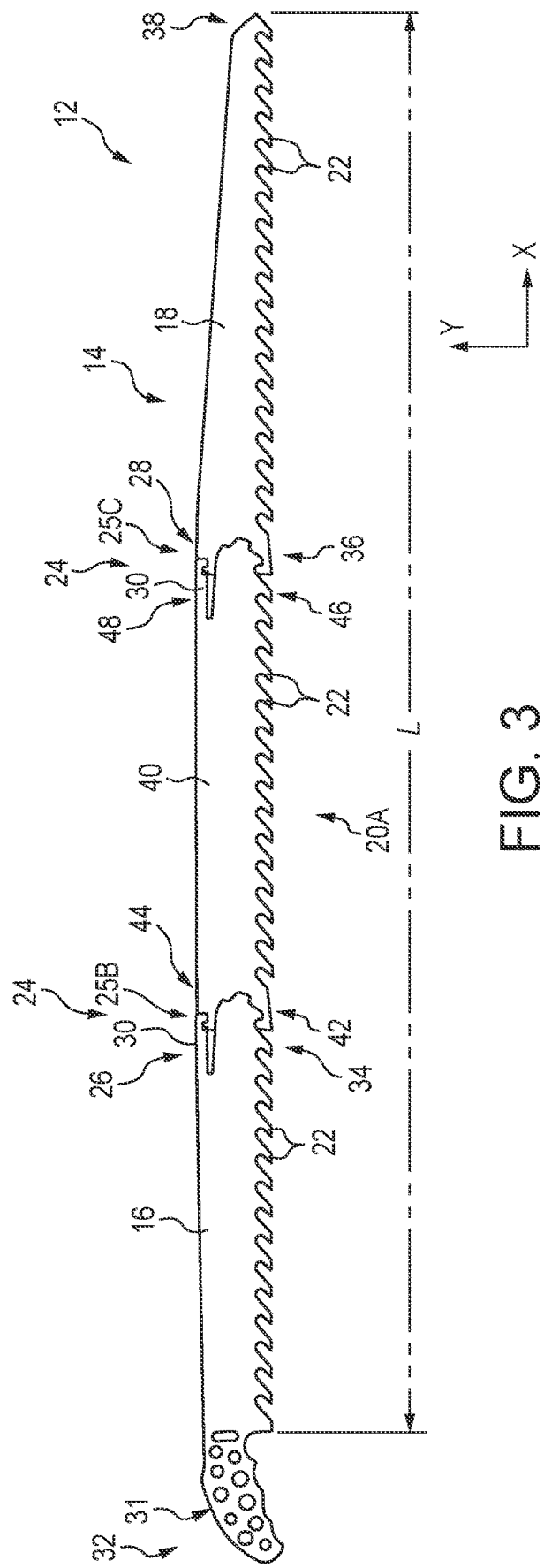
FIG. 3 is side elevation view of another interlocked state of the segmented tool of FIGS. 1 and 2 having an additional intermediate segment.

Referring now to FIG. 3, an optional intermediate segment 40 is shown connected between the segments 16, 18. The intermediate segment 40 includes proximal end 42 including complementary portion 44 and distal end 46 including complementary portion 48. The intermediate segment 40 forms a rigid connection 25B by interlocking between portions 26, 44 and a rigid connection 25C by interlocking between portions 28, 48, each as optional portions of the connection system 24, such that the segments 16, 19, 40 define a working member length L having working surface 20A. The rigid connections 25B and 25C are illustratively formed as part of respective connection systems 24, similar to the rigid connection 25A, except formed with the intermediate segment 40. The segmented tool 12 can be implemented in either of the configurations of FIG. 1, without intermediate segment 40, and FIG. 3, with intermediate segment 40, and may be implemented with more than one intermediate segment 40 connected in series between the segments 16, 18.

Referring to FIG. 4A-8B, the connection system 24 is shown closer for descriptive ease. In FIGS. 5A and 5B, the segments 16, 18, and namely, the complementary portions 26, 28, are shown engaged with each other but without interlocking. The details of the connection system 24 are described in view of the configuration shown in FIG. 1 connecting segments 16, 18 together with connection 25A, without intermediate segment 40, but apply equally to connections 25B, 25C, unless indicated otherwise.

Figure 5A:
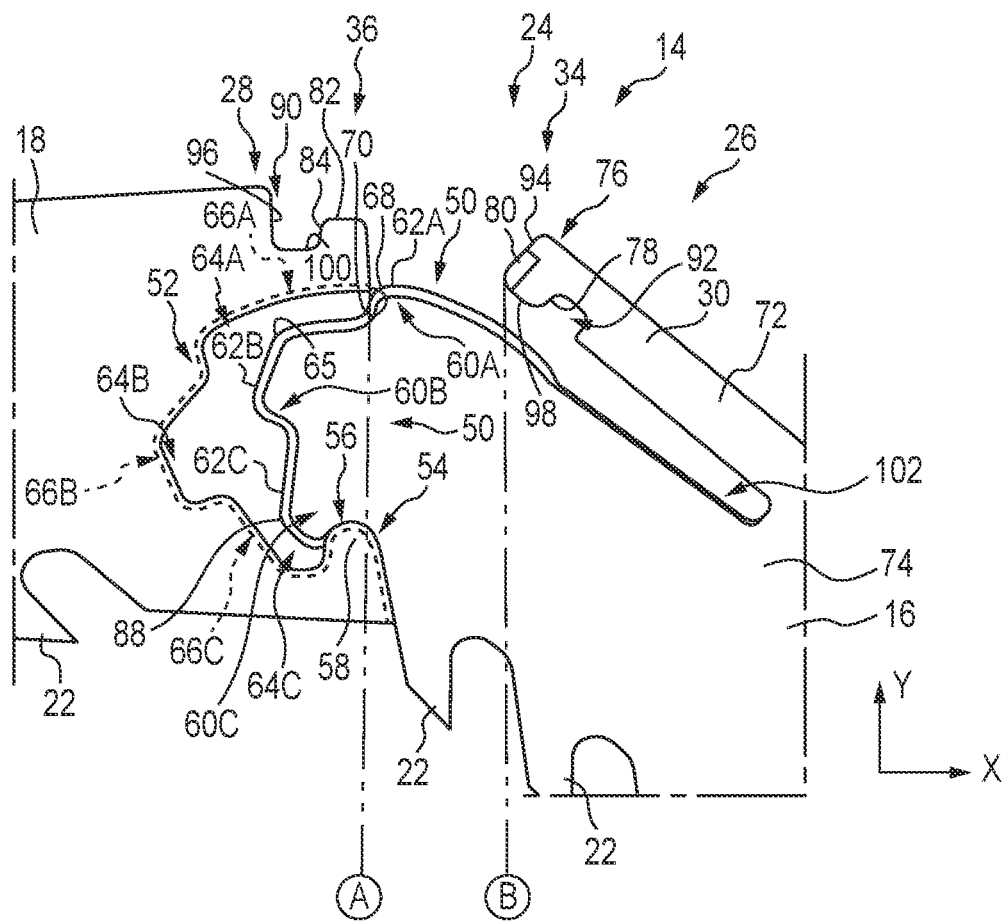
FIG. 5A is a side elevation view of portions of the segmented tool of FIGS. 1-4B showing that the segments are partially engaged by a fulcrum connection.
Figure 5B:
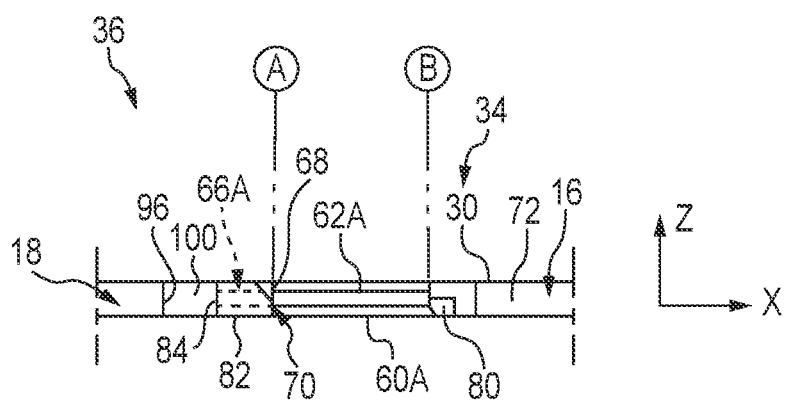
FIG. 5B is a top plan view of the portions of the segmented tool of FIG. 5A.

Referring to FIGS. 5A and 5B, the complementary portion 26 illustratively includes a connection head 50 formed for engagement with a receiver 52 of the complementary portion 28. In the illustrative embodiment, engagement between the connection head 50 and the receiver 52 includes engagement therebetween to form a tongue and groove connection, as discussed in additional detail herein. The connection system 24 includes a fulcrum connection 54 defined collectively by a lever 56 of the connection head 50 and a fulcrum 58 of the receiver 52. In the illustrative embodiment, the fulcrum 58 of the receiver 52 is embodied as a rounded convex portion for receiving engagement of the lever 56 of the connection head 50 to permit pivoting of the segments 16, 18 relative to each other about the fulcrum connection 54. The lever 56 is illustratively embodied as a rounded concave portion for receiving engagement of the fulcrum 58 of the receiver 52 to permit pivoting of the segments 16, 18 relative to each other about the fulcrum connection 54.

Figure 4A:
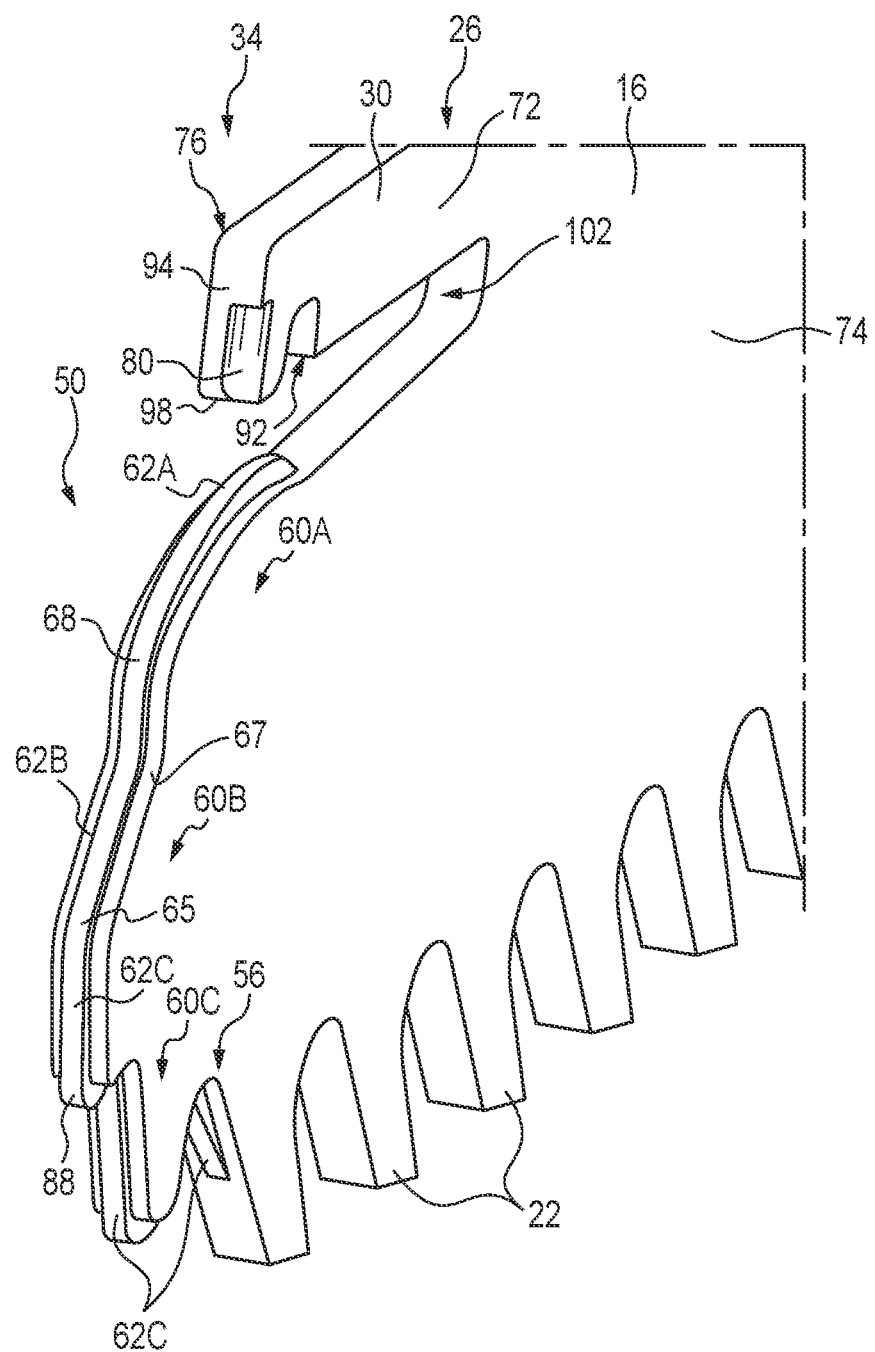
FIG. 4A is a close perspective view of a connection head portion of the connection system one of the segments of the segmented tool of FIGS. 1-3 showing that the connection head portion includes a number of knuckles forming a tongue for connection with the other segment, and showing that the segment includes a latch for selective interlocking with the key.

Referring to FIG. 4A, the connection head 50 includes a number of knuckles 60, including knuckles 60A, 60B, 60C. The knuckles 60 are illustratively formed as protrusions extending from the segment 16 within the working plane as a portion of the connection head 50 for complementary engagement with the receiver 52. Each knuckle 60A-C illustratively includes a tongue 62A-C for complementary engagement with a groove 66A-C of the receiver 52 to form a tongue and groove connection.

The tongue 62 of each knuckle 60 is illustratively formed as a single continuous rib projecting from an outer face 67 of each knuckle 60A-C and extending along each knuckle 60A-C with conforming curvature to the shape of each knuckle 60A-C. The tongue 62 is centrally formed about the width of the outer face 67, complementary with the groove 66, as discussed herein, to provide symmetry in the tongue and groove connection and promoting even distribution of bending along the tongue and groove connection. In some embodiments, tongues 62A-C may be formed independently from each other and/or may extend only partly about the outer face 67 of the corresponding knuckle 60A-C.

Figure 4B:
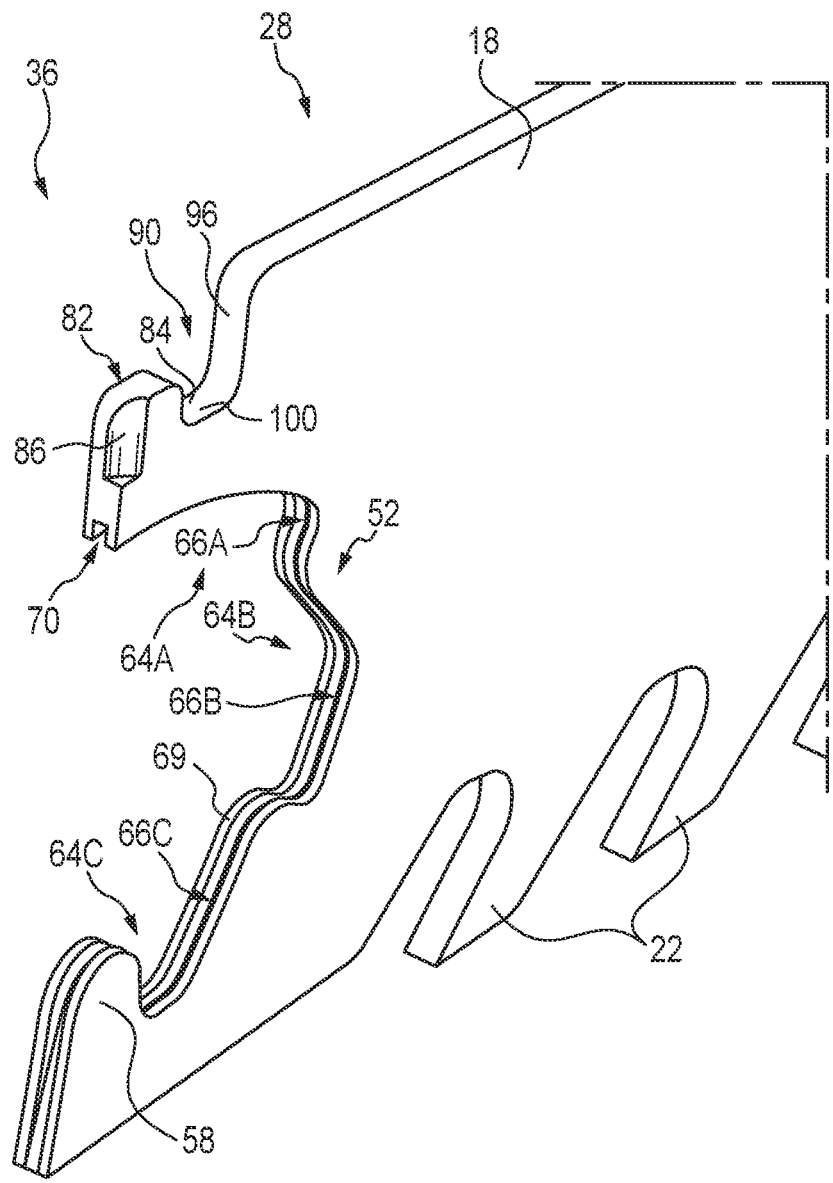
FIG. 4B is a close perspective view of a receiver portion of the connection system one of the segments of the segmented tool of FIGS. 1-3 showing that the receiver portion includes a number of detents forming the groove for receiving the tongue of the other segment, and showing that the segment includes a key for selective interlocking with the other segment.

Referring to FIG. 4B, the receiver 52 includes a number of detents 64, including detents 64A, 64B, 64C. The detents 64 are illustratively formed as receptacles defined by the receiver 52 within the working plane as a portion of the receiver 52 for complementary engagement with the corresponding knuckle 60 of the connection head 50. Each detent 64A-C illustratively includes a groove 66A-C for complementary reception of the tongue 62A-C of the corresponding knuckle 60A-C of the connection head 50 to form a tongue and groove connection.

The groove 66 of each detent 64 is illustratively formed as a single continuous groove defined within an edge surface 69 of the detents 64, and tracking about the edge surface of each detent 64A-C. However, in some embodiments, grooves 66A-C may be formed independently from each other and/or may track only partly about the edge surface 69 of the corresponding detent 64A-C.

In the illustrative embodiment as shown in FIG. 5A, the groove 66C extends along the fulcrum 58 of the fulcrum connection 54 to allow partial tongue and groove connection to be formed with engagement between the segments 16, 18 only by engagement between the fulcrum 58 and lever 56. Selective joining of the segments 16, 18 together is described in consideration of FIGS. 4A-8B and reference lines A-F provide orientation between the A & B figures.

In FIG. 5A, the fulcrum connection 54 has been formed by engagement between the fulcrum 58 and lever 56. In the illustrative embodiment, forming the fulcrum connection includes forming at least partial tongue and groove connection between the fulcrum 58 and lever 56. In the orientation of FIG. 5A, the segments 16, 18 can be pivoted towards each other about the fulcrum connection 54 to bring the latch 30 of portion 26 closer to the portion 28 for selective interlocking as discussed in additional detail herein. For example, the portion 26 can be pivoted counterclockwise and/or the portion 28 can be pivoted clockwise, about the fulcrum connection 54.

Referring to FIGS. 5A and 5B, initially, the latch 30 is spaced apart from the portion 28. The fulcrum connection 54 is formed and segments 16, 18 can be pivoted towards each other about the fulcrum connection 54 until at least partial engagement of the knuckle 60A with the detent 64A, as suggested in FIGS. 5A and 5B. Partial engagement of the knuckle 60A with the detent 64A includes insertion of the tongue 62A within the groove 66A, for example, insertion of a corner 68 of the tongue 62A within an open end 70 of the groove 66A. A corner 65 of the tongue 62B is not yet engaged with the groove 66B.

Figure 6A:
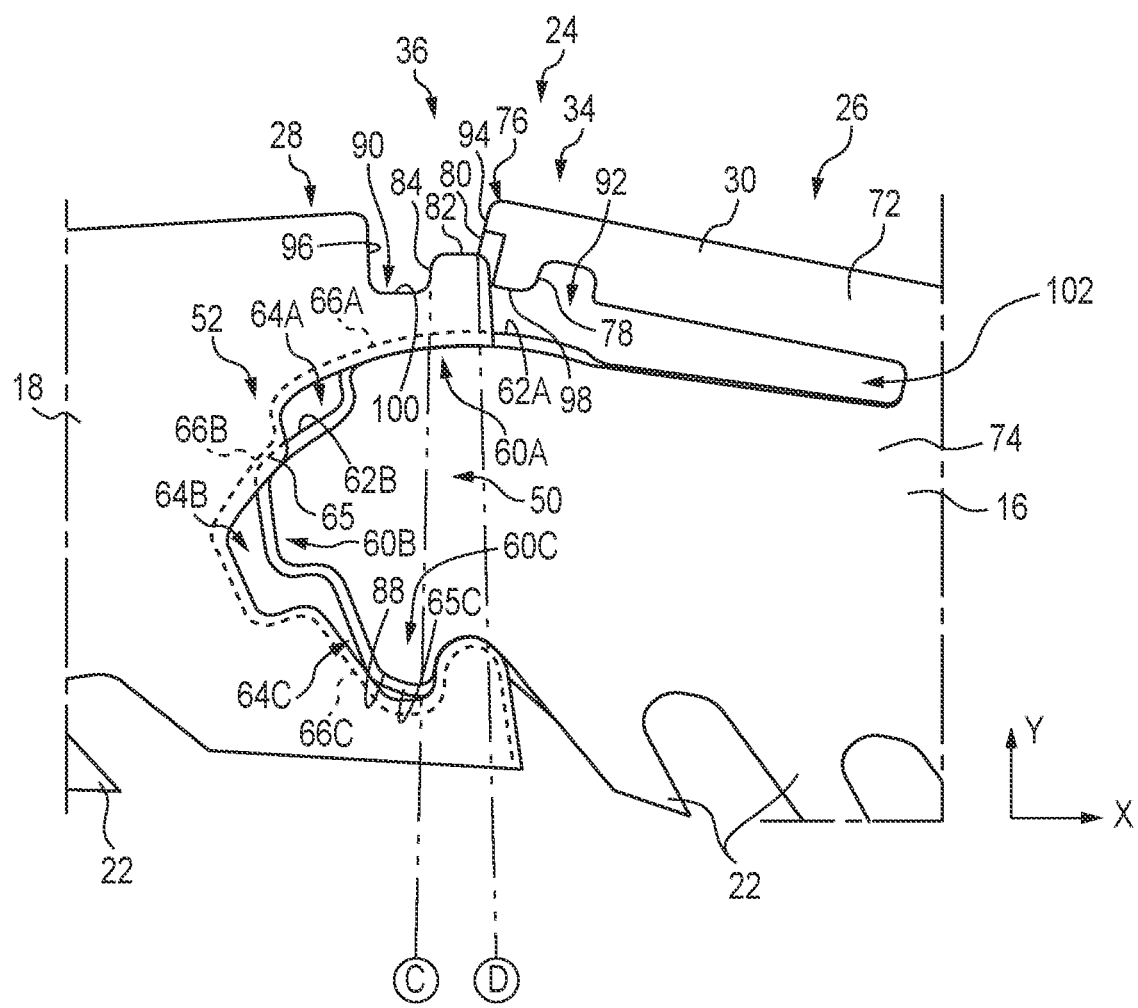
FIG. 6A is a side elevation view of portions of the segmented tool of FIGS. 1-5B showing that the segments are still partially engaged by the fulcrum connection and have been rotated further towards each other about the fulcrum connection compared with FIGS. 5A and 5B to engage the latch with the key.
Figure 6B:
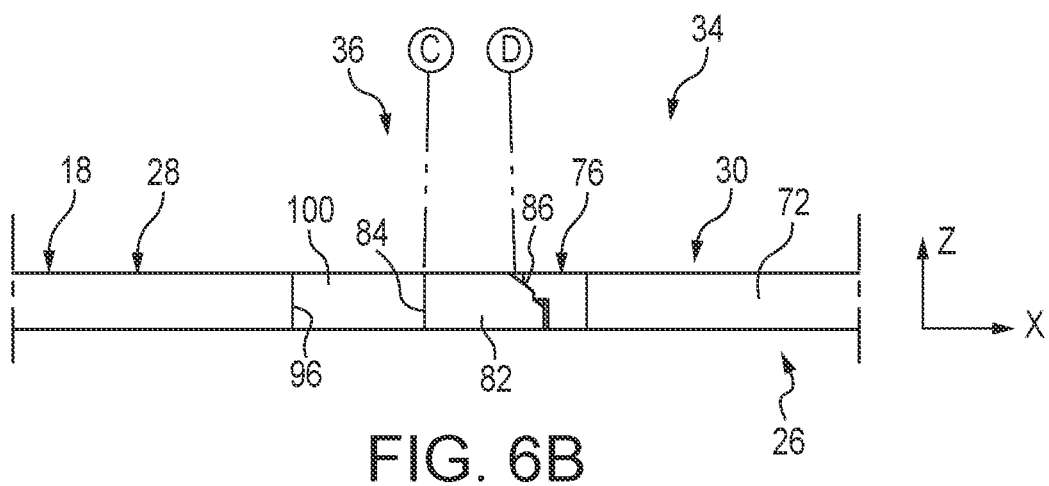
FIG. 6B is a top plan view of the portions of the segmented tool of FIG. 6A.

As suggested in FIGS. 6A and 6B, the segments 16, 18 have been pivoted towards each other to bring the latch 30 into engagement with the portion 28. The latch 30 includes an arm 72 connected on one end with a body 74 of the segment 16 and extending from the body 74 to a distal end. The latch 30 is illustratively formed integrated with body 74, cantilevered from the body 74 of the segment 16 for strong, but resilient deflection as disclosed herein. When undeflected, the arm 72 extends along the working plane in orientation with the working surface 20. To support selective interlocking of the segments 16, 18, the latch 30 can be resiliently deflected out from the working plane.

In the illustrative embodiment, the latch 30 includes a latch head 76 connected with the arm 72 on the distal end thereof. The latch head 76 defines an abutment surface 78 for engagement with the portion 28 to selectively block against disconnection between the first and second segments 16, 18 from interlocking. The abutment surface 78 is illustratively oriented facing away from the connection end 34 of the segment 16, towards the arm 72. The abutment surface 78 is illustratively formed as an interior surface of a recess formed in the arm 72 defining a posterior face of the latch head 76.

The latch head 76 includes a ramp 80. The ramp 80 is embodied as an angled face of the latch head 76 slanted across the longitudinal direction of the segmented tool 12. The ramp 80 can encourage lateral deflection of the latch 30 out from the working plane under engagement with the portion 28 to permit selective interlocking.

The segment 18 includes a key 82 formed as a part of the portion 28 on the connection end 36. The key 82 is formed for complementary engagement with the latch head 76 for blocking against disconnection between the segments 16, 18. The key 82 includes an abutment surface 84 for selective engagement with the abutment surface 78 of the latch head 76. The abutment surface 84 illustratively faces away from the connection end 36. The abutment surfaces 78, 84 thus generally face away from each other in the orientation of FIGS. 1-8B such that engagement between the abutment surfaces 78, 84 can block against disconnection of the segments 16, 18. Namely, when the connection head 50 is fully engaged with the receiver 52, and the latch 30 is engaged with the key 82 such that the abutment surfaces 78, 84 are engaged with each other, the segments 16, 18 are interlocked together restricted from pivoting away from each other about the fulcrum connection 54, as suggested in FIGS. 8A and 8B.

In FIGS. 6A and 6B, the segments 16, 18 have been pivoted towards each other about the fulcrum connection 54 to provide (initial) contact between the latch head 76 and the key 82. Referring to FIG. 6B, the key 82 includes a ramp 86 formed opposite and complementary with the ramp 80 to encourage deflection of the latch 30 out from the working plane under pivoting of the segments 16, 18 towards each other about the fulcrum connection 54; although in some embodiments, only one or the other of the latch head 76 and key 82 may include a ramp. In the illustrative embodiment, the ramps 80, 86 each slope to encourage the latch 30 to deflect out from the working plane to the right of the key 82, illustratively into the page in the orientation of FIG. 6A and upward in z-direction the orientation of FIG. 6B; however, in some embodiments, latch 30 may deflect leftward of the key 82.

Deflection of the latch 30 out from the working plane allows the latch 30 to remain rigidly opposed to deflection within the working plane (i.e., within the x-y plane) such that the latch 30 resists releasing connection with the key 82 under forces along the working plane, including forces from applying the working surface 20, for example, cutting forces imposed by using the teeth 22 to perform sawing. Accordingly, the strength of the connection system 24 can be maintained while permitting selective disconnection of the segments 16, 18, and while avoiding unintentional disconnection of the segments 16, 18.

In FIGS. 6A and 6B, the tongue 62A is more deeply received within the groove 66A than in the arrangement of FIG. 5A. The tongue 62B is partly engaged with the detent 64B such that a corner 65 of the tongue 62B is received within the groove 66B. The corner 88 of the tongue 62C (as shown in FIGS. 5A and 6A) is initially engaged within the groove 66C. As the tongue 62 and groove 66 forms through gradual pivoting of the segments 16, 18 together, the tongue and groove connection provides a stable connection to maintain alignment between the segment 18 and the body 74 of the segment 16 while the latch 30 can be deflected outward as discussed in additional detail herein.

Figure 7A:
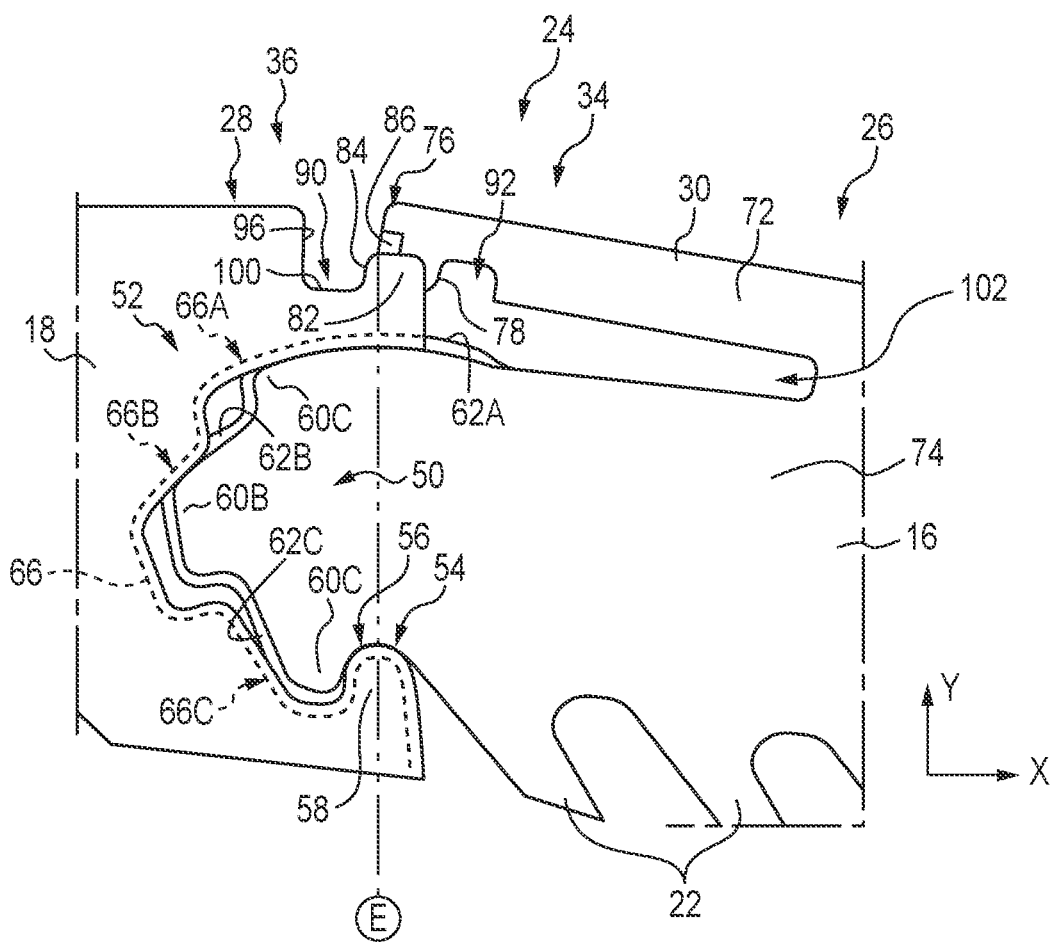
FIG. 7A is a side elevation view of portions of the segmented tool of FIGS. 1-6B showing that the segments are still partially engaged by the fulcrum connection and have been rotated further towards each other about the fulcrum compared with FIGS. 6A and 6B connection to deflect the latch to pass by the key.
Figure 7B:
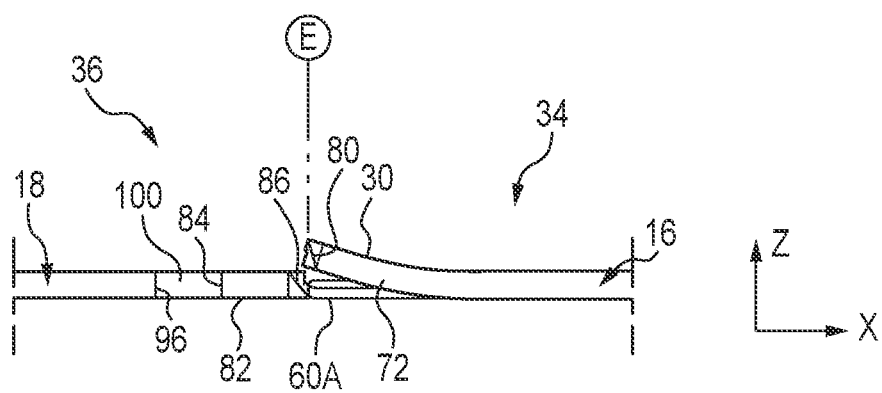
FIG. 7B is a top plan view of the portions of the segmented tool of FIG. 7A.

As shown in FIGS. 7A and 7B, the segments 16, 18 have been further pivoted towards each other about the fulcrum connection 54 to deflect the latch 30. Once the latch head 76 and the key 82 are engaged, pivoting the segments 16, 18 towards each other about the fulcrum connection 54 provides a longitudinal force between the latch head 76 and the key 82. The longitudinal force can be directed to deflect the latch 30 outward from the working plane to allow the latch head 76 to pass around the key 82.

In FIGS. 7A and 7B, the latch 30 is illustratively shown deflected out from the working plane to allow the latch head 76 to pass by the key 82 for selective interlocking. The latch 30 remains engaged with the key 82, as the segments 16, 18 continued to be pivoted towards each other, according to the resilient spring force of the latch 30 biasing return to its original in working plane position, such that the latch 30 slides along the lateral side of the key 82. The tongue 62A is more deeply received within the groove 66A. The tongue 62B is more engaged with the detent 64B such that the corner 65 of the tongue 62B is more fully received within the groove 66B. The corner 88 of the tongue 62B (as shown in FIGS. 5A and 6A) is further engaged within the groove 66C.

Figure 8A:
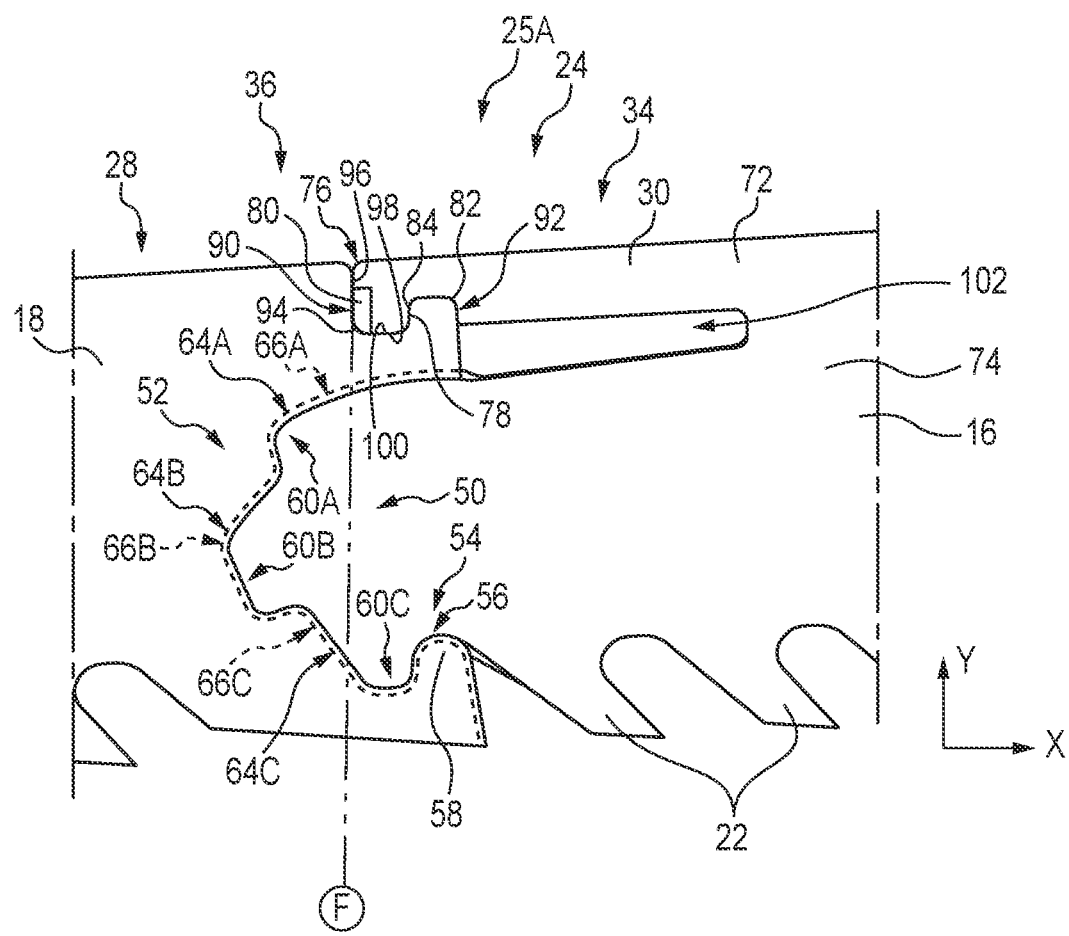
FIG. 8A is a side elevation view of portions of the segmented tool of FIGS. 1-7B showing that the segments have been rotated into full engagement, and showing that the abutment surfaces of the latch and key are engaged with each other to interlock the segments together blocking against disconnection.
Figure 8B:
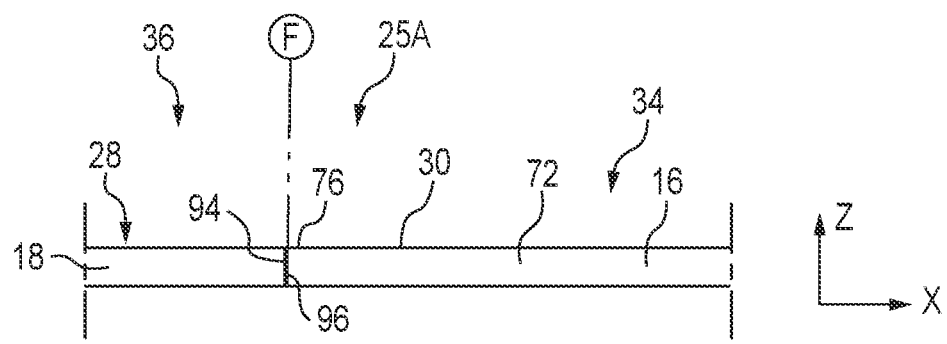
FIG. 8B is a top plan view of the portions of the segmented tool of FIG. 8A.

Referring now to FIGS. 8A and 8B, the segments 16, 18 have been pivoted towards each other about the fulcrum connection 54 to the extent that the latch 30 has passed by the key 82. The latch 30 returns to the working plane, engaged with the key 82, such that the abutment surfaces 78 and 84 engage with each other to block against disconnection of the segments 16, 18. For example, engagement between the abutment surfaces 78, 84 block against pivoting of the segments 16, 18 away from each other about the fulcrum connection 54.

In the interlocked state, as shown in FIGS. 8A and 8B, the latch head 76 rests in a receptacle 90 defined partially by the key 82. As suggested in FIGS. 8A and 8B, resting of the latch head 76 within the receptacle 90 includes engagement between the abutment surfaces 78, 84. In some embodiments, resting of the latch head 76 within the receptacle 90 may include engagement between an end surface 94 of the latch head 76 with an inner surface 96 of defining the receptacle 90 and/or engagement of an inner surface 98 with an interior surface 100 defining the receptacle 90. The latch 30 is illustratively embodied to be undeflected in the interlocked state, although in some embodiments, the latch 30 may be partially deflected in the interlocked state.

In the interlocked state, the key 82 rests within a recess 92 of the latch 30. The recess 92 is illustratively formed within the arm 72 of the latch 30. The recess 92 is partially defined by the abutment surface 84. As suggested in FIG. 8A, resting of the key 82 within the recess 92 includes engagement between the abutment surfaces 78, 84.

Engagement between the abutment surfaces 78, 84 blocks against pivoting of the segments 16, 18 away from each other about the fulcrum connection 54. Accordingly, while the latch 30 remains resting in the receptacle 90 such that the abutment surfaces 78, 84 engage with each other, the connection system 24 remains in an interlocked state blocking against disconnection of the segments 16, 18 from each other.

Selective disconnection of the segments 16, 18 can be achieved from the interlocked state by disengagement of the connection system 24, generally, by reverse operations as discussed above. From the interlocked state, the latch 30 can be deflected out from the working plane. Once the latch 30 is deflected out from the working plane sufficiently far to disengage the abutment surfaces 78, 84 from each other, the segments 16, 18 can be pivoted away from each other about the fulcrum connection 54. Progressively pivoting the segments 16, 18 away from each other allows the latch head 76 to pass by the key 82 and progressively withdrawing the tongue 62 from the groove 66. Once the knuckle 60A is disengaged from the detent 64A, the fulcrum connection 54 can be disengaged and the segments 16, 18 can be removed from each other. Accordingly, selective disconnection of the segments 16, 18 can provide for portability of the segmented tool 12.

Referring briefly to FIG. 8A, the latch 30 extends longitudinally defining a gap 102 between the arm 72 and the body 74. The gap 102 can provide relief for the connection system 24 from loose material build-up, for example, loose material from the subject matter to be cut, e.g., wood, snow/ice, etc. The gap 102 can block against build-up of such loose material which may applied pressure to the latch 30 and/or key 82 in the interlocked state and can present risk of inadvertent disengagement of the latch 30 with the key 82.

Within the present disclosure, the segments for interconnection can be formed from a single sheet of material, by machining, for example, laser and/or water jet cutting. The tongue and groove connection components can be formed by milling, such as CNC milling using a T-slot cutting tool. The connection system 24 can be formed integrally with the segments for selective interlocking. The latch can serve as a locking spring, having resiliency to permit selective operation between interlocked and disconnected states, and the need for additional and/or auxiliary tools can be avoided for selective interlocking and disconnection. Within embodiments, of the present disclosure, the segments 16, 18 define continuous lateral surfaces, promoting smooth tool operation.

Although certain illustrative embodiments have been described in detail above, variations and modifications exist within the scope and spirit of this disclosure as described and as defined in the following claims.

I claim:

1. A segmented tool, comprising:
   a first segment having a blade extending within a working plane,
   a second segment having a blade extending within the working plane for selective connection with the first segment, wherein at least one of the first and second segments includes a working surface defined along an end of the corresponding blade along the working plane, and
   a connection system comprising complementary portions of each of the first and second segments for engagement together to selectively connect the first and second segments to define a working length along a longitudinal direction along the working plane, the complementary portion of one of the first and second segments including a latch extending with a latch head for engagement with a key of the other of the first and second segments, the latch configured for resilient lateral deflection perpendicularly away from the longitudinal direction, out of the working plane, to permit the latch head and the key to misalign with each other to pass each other along the longitudinal direction, one of the first and second segments including a connection head and the other of the first and second segments including a receiver configured to receive the connection head, the connection head and the receiver collectively defining a fulcrum connection by engagement therebetween to permit pivoting of the first and second segments relative to each other, within the working plane, about the fulcrum connection to pass the latch head and the key relative to each other to selectively interlock the first and second segments.

2. The segmented tool of claim 1, wherein the latch includes an arm extending along the longitudinal direction.

3. The segmented tool of claim 1, wherein the arm extends undeflected along the working plane oriented with the working surface.

4. The segmented tool of claim 1, wherein the working plane is oriented orthogonally relative to the resilient deflection of the latch for latching.

5. The segmented tool of claim 2, wherein the latch head is connected with the arm and defines an abutment surface for engagement with the other one of the first and second segments to selectively block against disconnection of the first and second segments from each other.

6. The segmented tool of claim 5, wherein the abutment surface faces towards the arm.

7. The segmented tool of claim 5, wherein the abutment surface is defined for engagement with the key of the other of the other one of the first and second segments, the key defining a complementary abutment surface for engagement with the abutment surface of the latch head.

8. The segmented tool of claim 7, wherein the latch and the key are aligned along the longitudinal direction without lateral deflection of the latch.

9. The segmented tool of claim 7, wherein the abutment surface is arranged within a recess of the arm.

10. The segmented tool of claim 7, wherein at least one of the head and the key includes a ramp angled across the longitudinal direction to encourage lateral deflection of the latch under longitudinal force between the head and the other of the first and second segments for latching.

11. The segmented tool of claim 5, wherein the head includes a ramp angled across the longitudinal direction to encourage lateral deflection of the latch under longitudinal force between the head and the other of the first and second segments for latching.

12. The segmented tool of claim 1, wherein the latch is undeflected in an interlocked state between the first and second segments.

13. The segmented tool of claim 1, wherein one of the connection head and the receiver defines a tongue and the other of the connection head and the receiver define a groove to form a tongue and groove connection.

14. The segmented tool of claim 13, wherein each of the tongue and groove are formed centrally to define the tongue and groove connection symmetrically.

15. The segmented tool of claim 1, wherein the connection head includes a number of knuckles and the receiver includes a number of detents, each detent arranged to receive a corresponding one of the knuckles.

16. The segmented tool of claim 15, wherein a tongue and groove connection is formed between at least one of the knuckles and the complementary detent.

17. The segmented tool of claim 1, comprising a third segment that is selectively connectible with the second segment distal from the first segment.

18. The segmented tool of claim 1, wherein the first and second segments comprise segments of a saw, and the working surface comprises saw teeth.

* * * * *